United States Patent [19]

Smith et al.

[11] 4,325,513
[45] Apr. 20, 1982

[54] GUN FOR DISPENSING A PLURAL COMPONENT SYSTEM

[76] Inventors: Robert L. Smith, 2012 Summer Wind, Santa Ana, Calif. 92704; Gary L. Smith, 1287 Conway Ave., Costa Mesa, Calif. 92026

[21] Appl. No.: 132,251

[22] Filed: Mar. 20, 1980

[51] Int. Cl.³ .......................... B05B 7/04; B05B 7/12; B05B 15/02
[52] U.S. Cl. .................................... 239/112; 239/415; 239/416.1; 239/528
[58] Field of Search ............... 239/112, 414, 415, 416, 239/416.1, 417, 417.5, 418, 423, 433, 527, 528, 113

[56] References Cited

U.S. PATENT DOCUMENTS

| | | | |
|---|---|---|---|
| 3,606,170 | 2/1970 | Hoffman et al. | 239/414 |
| 3,790,030 | 2/1974 | Ives | 239/112 X |
| 3,799,403 | 3/1974 | Probst et al. | 239/414 X |
| 3,873,023 | 3/1975 | Moss et al. | 239/112 X |
| 4,117,551 | 9/1978 | Brooks et al. | 239/414 X |

*Primary Examiner*—Andres Kashnikow
*Attorney, Agent, or Firm*—K. H. Boswell

[57] ABSTRACT

A gun for dispensing a plural component system includes a housing having appropriate connections to a pressurized air supply and pressurized first and second component storage reservoirs. Within the housing are located first and second component feed ports, each having a control valve located in its interior. A valve carrier member is movably located in the housing and is moved by a trigger. The first and the second valves are connected to and moved in response to movement of the valve carrier member. The gun includes a gas passage having a gas valve located therein. The gas valve is also connected to and moves in response to the valve carrier. At the forward end of the housing is a static mixing chamber which has a discharge outlet as well as inlets leading to both of the component feed ports and to the air passage. When the valve carrier is in a first position pressurized air is introduced into the mixing chamber which purges the mixing chamber. When the valve carrier is in a second position the components of the plural component system are discharged from the respective component feed ports into the mixing chamber and out of the discharge outlet.

11 Claims, 6 Drawing Figures

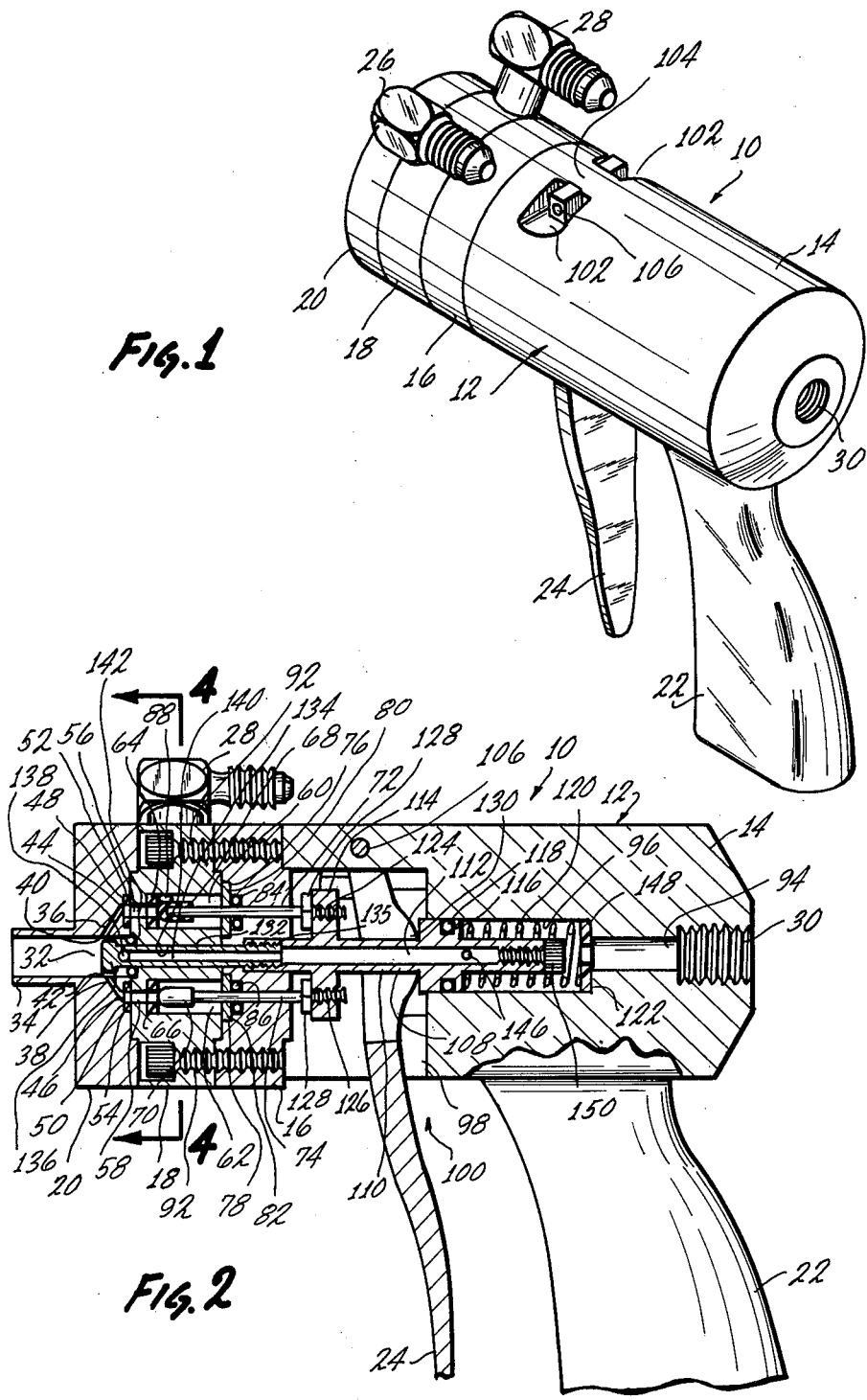

GUN FOR DISPENSING A PLURAL COMPONENT SYSTEM

BACKGROUND OF THE INVENTION

This invention is directed to a gun for dispensing a plural component system which includes a valve carrier movable within the gun such that both the component control valves and an air control valve are movable in response to the valve carrier. In one position of the valve carrier the components are dispensed through a mixing chamber and in another position of the valve carrier the mixing chamber is purged of any residual components by dispensing air into the mixing chamber.

For dispensing polyurethane foam systems and other plural component systems wherein two or more components are mixed immediately prior to dispensing, several dispensing guns are known. These guns have been developed because the components of the respective plural component system polymerize very rapidly upon mixing. Upon polymerization the components set up into masses which cannot be conveniently dispensed. Any attempt to mixing the components prior to dispensing inevitably leads to clogging or plugging of the dispensing system.

In any dispensing system for plural components it is necessary to mix these components somewhere in the dispensing system. This requires some form of mixing chamber to always be included in the dispensing system. Upon cessation of use of the plural components some material remains in the mixing chamber and if not removed will polymerize in the mixing chamber into a fused mass which must be mechanically removed. This of course is impractical to do. Further, in those systems wherein the dispensing unit is continually being cycled off, it is of course impractical to have to repeatedly clean the mixing chamber.

In order to circumvent these problems spray guns have been devised which provide for cleaning of the mixing chamber with either a mechanical plunger or a blast of pressurized air each time the stream of the individual members of the plural component system is interrupted. One such system relies on a piston which is machined to fit the walls of the mixing chamber and mechanically forces out any remaining portions of a plural component system upon returning the trigger of the spray gun to an off position. Unfortunately, the utility of this system requires maintaining of close tolerances between the mixing chamber and the cleansing piston. This system deteriorates with age and wear.

U.S. Pat. Nos. 3,799,403 and 3,873,023 describe spray gun type apparatuses which utilize an air blast to purge their mixing chambers. Both of these utilize a movable mixing chamber having a T-shaped passage located therein. The individual components of the plural component system are injected into the arms at the top of the T and they exit out of the base of the T. In both of these, the mixing chamber moves between a position wherein the components of the plural component system are injected into the arms of the T and a position wherein air is injected into the arms of the T. One of the patents describes a spray gun wherein the mixing chamber moves radially between these two positions and in the other the mixing chamber moves axially. In both of these, since the mixing chamber in fact moves either some machining to close tolerances of these areas of the mixing chamber wherein the openings of the arms are located and those areas of the housing wherein both the air and the plural components exit into the arms of the mixing chamber must be done or seals must be used in these areas. If the parts are machined, the machine parts of course are also susceptible to wear and any leakage between the movable mixing chambers and other components of the housing require disassembly of the unit to effect cleaning. If seals are used, the seals are continuously exposed to abrasion by the edges formed by the openings of the passageways moving across them each time the mixing chamber moves. This of course leads to early failure of the seals.

In any spray gun or similar device wherein the individual components of a plural component system are injected into passageways which are directly opposed to each other such as the passageways in the arms of the T's of the mixing chambers of the above noted patent, should the nozzle of the device become clogged one individual component can be injected into or flow into the passageway of the other components and thus mix with the other components within its passageway. Since the nozzle is clogged once mixing has been effected polymerization quickly follows and these passageways become clogged. Further, since these passageways are located in movable mixing chambers the length of the passageways is restricted by the size of the mixing chamber. Thus, the passageways are inevitably quite short. This makes it easier for one component to contaminate not only the passageway of the other components within the mixing chamber, but also the passageway of the other components within the housing and even into the supply lines.

In view of these problems with the prior art devices it is evident there exists a need for a dispensing system for plural component systems which utilize an air purge of the mixing chamber thus eliminating the need for high tolerances required in mechanical purge systems, but does not rely on a movable mixing chamber thus eliminating the need for close tolerances between the mixing chamber and the housing and allowing for longer component supply ducts or passageways. Further, since different plural component systems are sprayed under different pressure, the mechanics of the dispensing system must be adaptable to handle different pressures and different plural component systems.

BRIEF SUMMARY OF THE INVENTION

It is an object of this invention to provide a dispensing system which utilizes the features outlined in the preceding paragraph. It is a further object of this invention to provide a plural component dispensing system which is readily adaptable to a hand-held, lightweight gun yet is foolproof in its operation and self-purging. It is a further object to provide a plural component dispensing system which is simple in its operation and thus economically manufactured and capable of sustained use and easy replacement of parts.

These and other objects as will become evident from a remainder of the specification are provided in a gun for dispensing a plural component system which comprises: a housing including a first component receiving means, a second component receiving means and a gas receiving means, said first component receiving means connectable to a pressurized source of a first component of said plural component system, said second component receiving means connectable to a pressurized source of a second component of said plural component system and said gas receiving means connectable to a source of pressurized gas; a first component feed port means connected to said first component receiving means and receiving a pressurized supply of said first component of said plural component system from said first component receiving means; a second component feed port means connected to said second component receiving means and receiving a pressurized supply of said second component of said plural component system from said second component receiving means; a first valve means located in said first component feed port means; a second valve means located in said second component feed port means; a valve carrier means movably located in said housing; said first valve means and said second valve means operatively connected to said valve carrier means and movable within said first and said second component feed port means respectively in response to movement of said valve carrier means; a gas passage means connected to said gas receiving means and receiving a supply of pressurized gas from said gas receiving means, said gas passage means including a gas valve means, said gas valve means operatively connected to said valve carrier means and moving in response to movement of said valve carrier means; a static mixing chamber means attaching to said housing and including a mixing chamber, a discharge outlet connecting to said mixing chamber, a first component inlet means connecting to said mixing chamber, a second component inlet means connecting to said mixing chamber and a gas inlet means connecting to said mixing chamber, said gas inlet means operatively connected to said gas passage means, said first component inlet means operatively connected to said first component feed port means and said second component inlet means operatively connected to said second component feed port means; trigger means movably mounted on said housing, said valve carrier means operatively associated with said trigger means and moving between a first position and a second position in response to movement of said trigger means; said first and said second valve means prohibiting the flow of said first and said second component from said first and said second component feed port means, respectively, into said first and said second inlet means, respectively, and said gas valve means allowing flow of said pressurized gas from said gas passage means into said mixing chamber through said gas inlet means when said valve carrier means is in said first position and said first and said second valve means allowing flow of said first and said second components from said first and said second component feed port means into said first and said second component inlet means, respectively, and into said mixing chamber and controlling the flow of said pressurized gas from said gas passage means into said gas inlet means when said valve carrier means is in said second position; said first and said second component flowing into said mixing chamber and being discharged out of said discharge outlet when said valve carrier means is in said second position and said pressurized gas flowing into said mixing chamber and discharging the contents of said mixing chamber out of said discharge outlet when said valve carrier means is in said first position.

Preferably the first and second valve means include first and second valves respectively, each having a valve head and the first and second feed port means each include a valve seat which the valve heads seal against. Each of the component inlets include a passageway leading between the mixing chamber and the respective valve seats. Each of the valves attach to the valve carrier means and move in conjunction with movement of the valve carrier means.

The component feed ports each comprise a closed chamber and include openings wherein the stems of the valves pass through. Surrounding the openings are sealing means which seal against the valve stems.

The valve carrier means preferably includes a carrier member, at least a portion of which is slidably mounted in a cylindrical chamber forming part of the receiving chamber means. The trigger means includes a trigger pivotally mounted to the housing and operatively contacting the carrier member. The carrier member includes an elongated shaft having an axially oriented gas passageway along at least a portion of its length. Located on the shaft is an annular flange and an annular piston. The annular piston is sized to fit into the cylindrical chamber. The first and second valves attach to the annular flange. The gas valve means preferably includes an elongated gas valve having an axially extending gas passageway along at least a portion of the length of its stem. The gas passageway in the gas valve seals with and communicates with the gas passageway in the carrier member. The gas valve includes a valve head which seals against a sealing means located in the rear of the mixing chamber.

BRIEF DESCRIPTION OF THE DRAWINGS

The invention described in this specification will be more fully understood when taken in conjunction with the drawings wherein:

FIG. 1 shows an isometric view of the plural component dispensing gun of the invention;

FIG. 2 is a side elevational view in section of one embodiment of the dispensing gun of FIG. 1;

Figures 3, 4:
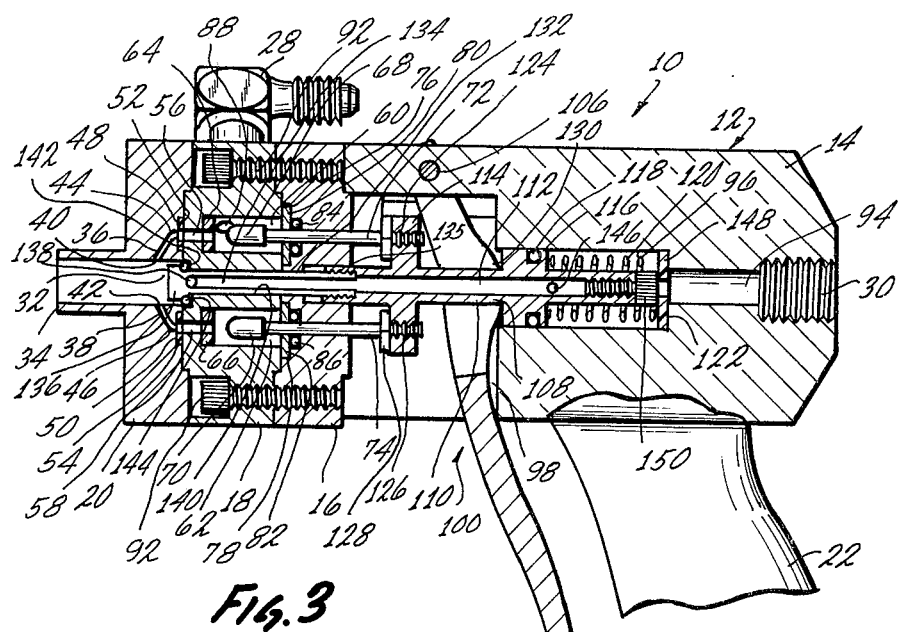
FIG. 3 is a side elevational view also in section of the embodiment shown in FIG. 2 except that certain components of the gun are shown in a different spatial relationship.
FIG. 4 is an end elevational view in section about the line 4—4 of FIG. 2.

The dispensing gun shown in the figures and described in this specification utilizes certain principles and/or concepts as are set forth and defined in the claims appended to this specification. Those skilled in the dispensing arts will realize that these principles and/or concepts could be utilized in a number of differently appearing embodiments differing from the exact embodiment herein disclosed; however, not differing from the principles and concepts embodied in the claims. For this reason this invention is understood to be defined by the claims and is not limited to the exact embodiment described in this specification and shown in the figures.

DETAILED DESCRIPTION

The dispensing gun 10 shown in FIG. 1 has a housing 12 made up of several component parts. These component parts include rear section 14, rear midsection 16, front midsection 18 and front section 20. These sections are all machined with appropriate interlocking bosses and annuluses (not numbered) which interlock to maintain the sections in relation to one another. Attaching to the rear section 14 is a trigger 24. Attaching to the uppermost surface of front midsection 18 are component inlet nipples 26 and 28. Located in the rear end of rear section 14 is a gas receiving port 30.

While the gun 10 of this invention can be used for dispensing many plural component systems, it is primarily envisioned that the gun 10 will be used for dispensing two separate types of plural component systems. The first of these systems is generally identified as a packaging system. In this system the individual components of the plural component system are supplied to the nipples 26 and 28 of the gun 10 at pressures of approximately 200 pounds per square inch. Generally the packaging system would dispense what are known in the art as flexible polyurethane foam. The second of these systems is generally identified as a spray system. In the spray systems the individual components of the plural component system would be delivered to the nozzles 26 and 28 at pressures upward of 1000 pounds per square inch. Generally, polyurethane spray foams would be produced by this spray system.

Because of the high pressures utilized in the spray system certain considerations must be made which are best made by providing certain design features in the mixing chamber. Because of the high pressures it is considered advantageous to maintain the volume of the mixing chamber as small as possible. This alleviates problems resulting from back pressure if clogging occurs within the mixing chamber or downstream from the mixing chamber. For those plural component systems falling under the category of packaging systems, the design features utilized for the spray systems could be used. However, since the working pressures are much lower it is generally not required to minimize the size of the mixing chamber as per the case of the spray system. To better effect mixing of the components of the plural component system of the packaging system, it is preferable to utilize a slightly larger mixing chamber. Since back pressures are not a problem in the packaging system increase in size of the mixing chamber is not a problem.

Because of these considerations certain components of the gun 10 of this invention are described as separate embodiments. Other components of the gun 10, however, find dual utility in both the spray system and the packaging system, and in the interest of brevity their description will not be repeated for both embodiments.

Figure 5:
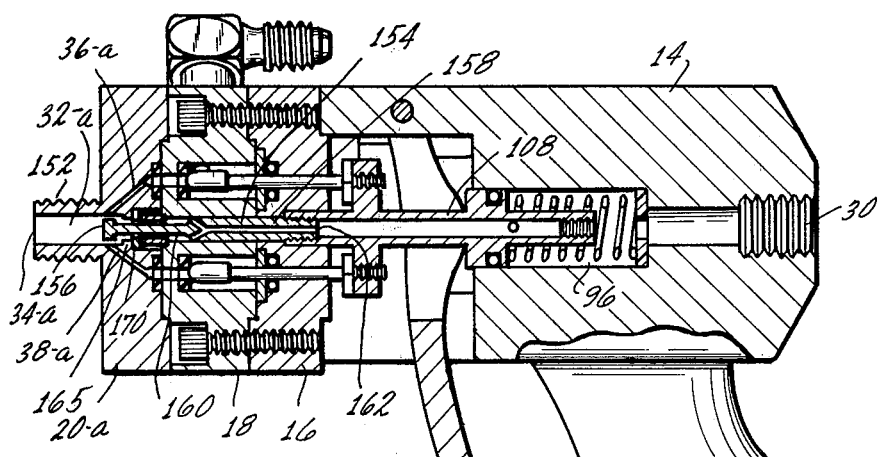
FIG. 5 is a side elevational view in section of a second embodiment of the gun of FIG. 1.
Figure 6:
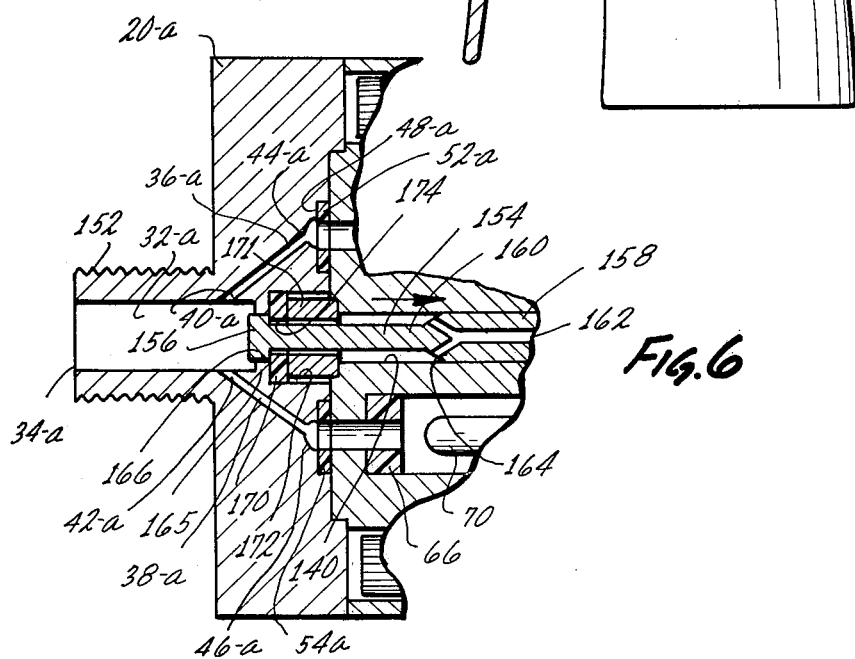
FIG. 6 is a side elevational view in section showing an enlargement of the forward end of the gun shown in FIG. 5 and additionally showing certain components of the gun in a different spatial relationship.

The embodiment pictured in FIGS. 2 and 3 is directed to the packaging system. The embodiment pictured in FIGS. 5 and 6 is directed to the spray system. The end elevational view of FIG. 4 is universal for both systems as is the outside appearance of the gun 10 illustrated in FIG. 1.

Located in the front section 20 as illustrated in FIGS. 2 and 3 is the mixing chamber 32. Mixing chamber 32 includes an outlet 34 through which the completed plural component system is discharged. Two dump tubes 36 and 38 lead into the mixing chamber 32. The dump tubes 36 and 38 are set at an oblique angle to each other. The placement of the dump tubes 36 and 38 at an oblique angle accomplishes several things. First of all, a turbulent flow of the individual components of the plural component system is achieved by this oblique displacement. Secondly, because the dump tubes 36 and 38 are placed at an oblique angle with respect to one another, they do not feed directly into one another. Additionally, placement of the dump tubes 36 and 38 at an oblique angle allows for elongation of these dump tubes.

In combination, the elongation of the dump tubes 36 and 38 and the lack of direct feeding into one another serve as a preventive measure to inhibit contamination of the component of one of the dump tubes and other portions of the system upstream from the dump tubes with the component flowing through the other dump tube. As noted previously, contamination of one component with another component in any of the lines of a plural component dispensing system results in polymerization in that line and plugging of the line. As hereinafter described nipples 26 and 28 feed dump tubes 36 and 38. Should the pressure of the component supplied to either nipples 26 or 28 be slightly different than the pressure of the other component and should a plug or a clog occur within the mixing chamber 32 or the outlet 34, the components feeding out of the dump tubes 36 and 38 into the mixing chamber 32 will be fed at different pressures. It is theoretically possible that should the dump tubes 36 and 38 be in direct alignment with one another the component at a higher pressure could feed or be injected into the dump tube holding the component at a lower pressure. By setting the dump tubes 36 and 38 at an angle this possibility is minimized.

Because the dump tubes 36 and 38 can be elongated even if cross contamination occurred in one of the dump tubes, elongation of, coupled with the small diameter of, the dump tubes would result in restricted flow within the contaminated dump tube, thus also inhibiting polymerization of the plural component system upstream from the dump tubes.

Ends 40 and 42 respectively of the dump tubes 36 and 38 feed into mixing chamber 32. The other ends 44 and 46 of the dump tubes 36 and 38 feed into drillings 48 and 50 in front section 20 in which seals 52 and 54 are inserted. Preferredly the seals 52 and 54 are teflon O-rings. Front midsection 18 contains appropriate drillings 56 and 58 which lead into drillings 48 and 50. The seals 52 and 54 form a fluid impervious seal between the drillings in the respective front section 20 and front midsection 18.

The drillings 56 and 58 lead to feed chambers 60 and 62, respectively. The feed chambers 60 and 62 serve as feed ports for the dump tubes 36 and 38. Located in one end of the feed chambers 60 and 62 are valve seat rings 64 and 66 respectively. The rings 64 and 66 are preferredly teflon rings which are appropriately shaped to accept valve heads 68 and 70 mounted on valve stems 72 and 74 respectively. As with the seat rings the valve heads 68 and 70 are preferredly formed of teflon and are shaped to form fluid impervious seals with the seat rings 64 and 66. Not shown in the figures is the fact that the valve stems 72 and 74 are threaded and the valve heads 68 and 70 screw on to these threads. This allows for easy replacement of the valve heads 68 and 70 when required because of wear.

Front midsection 18 mates with rear midsection 16. Machined into rear midsection 16 are drillings 76 and 78 which accept seals 80 and 82 and valve stem O-rings 84 and 86 respectively. In combination the seals 80 and 82 and the O-rings 84 and 86 effectively seal the feed chambers 60 and 62 with respect to both alignment of the sections 16 and 18 and seal between the valve stems 70 and 72 and section 16.

As seen in FIG. 4 leading from chamber 60 to nipple 26 is a supply passageway 88. Likewise, leading from chamber 62 to nipple 28 is a supply passageway 90. One of the components of the plural component system is fed to dump tube 36 via nipple 26 by a route taking it through passageway 88 to chamber 60 past valve head 68 through seat ring 64. Likewise, the other component is fed through nipple 28 to dump tube 38 by the corresponding component associated with chamber 62.

The gun 10 illustrated in the figures and described in this specification is adapted to dispense a two-component plural component system. The current state of the art of plural component systems is based on two component systems. The gun 10, however, could be readily adaptable to more complex component systems by incorporating additional chambers, valves, etc. corresponding to the two herein described. Thus, in place of two chambers 60 and 62, three, four or more chambers could be utilized. Appropriate extra nipples, dump tubes, etc. would be analogously placed in the sections 16 and 18. Additionally, as hereinafter described, valve stems for the additional valves could be attached to the controlling components as is hereinafter described for the attachment of valve stems 72 and 74.

As can be seen in the side elevational view in the drawings, section 16 is bolted to section 18 via two hex head bolts 92 spaced 180 degrees apart from each other. Likewise, section 20 is attached to section 18 and section 16 attached to section 14. These attachments, however, would be 90 degrees out of phase from the bolts 92. The bolts used to attach the front section 20 would be of such a length that they would not interfere with the bolts used to attach section 16 to section 14.

Rear section 14 contains several drillings aside from the gas receiving port 30. The gas receiving port 30 is appropriately threaded to receive a connecting nipple. Extending forward from port 30 is a gas duct 94. Forward of gas duct 94 is cylindrical chamber 96. Forward of cylindrical chamber 96 and extending to the front of rear section 14 is void area 98. An end of cylindrical chamber 96 is continuous with area 98. Void area 98 is open at opening 100 at the bottom of the gun 10 allowing for projection of trigger 24 downwardly. In essence the opening 100 is a rectangular passageway opened on its forward end extending downwardly from void area 98. Opening upwardly from void area 98 are two openings collectively identified by the numeral 102 having a bridge 104 between them. The top of the trigger 24 is bifurcated to fit around bridge 104 allowing trigger 24 to be pivotally mounted to bridge 104 via a bolt 106.

A valve carrier 108 fits within the interior of the gun 10 axially centralized within sections 14 and 16. Valve carrier 108 has a central shaft 110 which is hollow forming a gas passageway 112 extending axially along its longitudinal axis. Positioned near the forward end of the shaft 110 is an annular flange 114. Positioned near the rearward end of the shaft 110 is an annular piston 116. Piston 116 includes an appropriate annular slot (not numbered) in its surface which receives an O-ring 118. That portion of the valve carrier 108 including piston 116 and the shaft 110 extending rearwardly from it fits within the cylindrical chamber 96. Piston 116 is sized to just fit within chamber 96 and O-ring 118 makes the seal which is impervious to pressurized gas between the piston 116 and the walls of the chamber 96. A compression spring 120 fits between the piston 116 and the rear wall 122 of chamber 96 biasing the valve carrier 108 to the front of the gun 10 to a first position.

The ends of valve stems 72 and 74 are threaded and are received in holes 124 and 126 in the flange 114. The holes 124 and 126 are threaded such that the valve stems 72 and 74 can be fixedly located with respect to the annular flange 114 by securing nuts collectively identified by the numeral 128. By so securing the valve stems 72 and 74 this way, the valve heads 68 and 70 can be positioned to correctly seal with the seats 64 and 66.

Trigger 24 has an arcuate area 130 on its rear surface which fits against the front portion of piston 116. Normally the valve carrier 108 is biased forward into the first position by spring 120. When trigger 24 is squeezed toward handle 22 against the bias of spring 120, the trigger 24 pivots about bolt 106 contacting area 130 against the piston 116 depressing the valve carrier 108 rearwardly in the housing 12 into a second position.

Except for certain features in the front section 20 relating to the mixing chamber 32 all of the components as hereintofore described are identical in the embodiments as exemplified by FIGS. 2 and 5. These embodiments differ, however, in regard to certain features specific to the air passage systems. Further, in FIGS. 2 and 5 the valve carrier 108 is in the first position and in FIGS. 3 and 6 it is in the second position.

In the packaging system embodiment illustrated in FIGS. 2 and 3, an air valve 132 having threads on its stem 135 screws into appropriate threads on the front of valve carrier 108. A gas passage 134 extends axially along the length of the stem 135 of air valve 132. The gas passage 134 is continuous with the gas passage 112 in valve carrier 108. The head 136 of valve 132 flares out with regard to the stem 135 of this valve. Located behind the head is a gas port 138 which extends transversely to the longitudinal axis of the valve and communicates with the gas passage 134. Thus, gas passing through the valve carrier 108 will be transmitted via passage 134 to port 138. The valve 132 fits into a drilling 140 extending through sections 16 and 18. The drilling 140 is slightly larger than both valve stem 135 and valve carrier 108, allowing them to freely slide within it.

In the front of section 18 is a drilling 142 wherein an O-ring 144 is located. When the trigger 24 is pulled toward the rear of the gun moving valve carrier 108 backwardly to its second position, the air valve 132 also moves rearwardly. The head 136 of this valve seals against O-ring 144 and prevents escape of gas through the gas port 138 into the mixing chamber 34. Simultaneously valve stems 72 and 74 have been drawn toward the rear of the gun 10.

This unseats valve heads 68 and 70 from seat rings 64 and 66. The components of the plural component system located in the chambers 60 and 62 are thus allowed to feed into the mixing chamber 32 through the dump tubes 36 and 38. As long as the trigger 24 is maintained in its rearward position, the components are fed to the mixing chamber and the appropriate plural component system is formed therein and is ejected out of the outlet 34. When the trigger 24 is released spring 120 pushes the valve carrier 108 forward to its first position. In so doing valve heads 68 and 70 seal against seat rings 64 and 66 closing off the supply of the components of the plural component system feeding into mixing chamber 32. This allows compressed gas to be fed past the air valve head 136 into the mixing chamber 32. The compressed gas flows past the valve head 136 and purges the mixing chamber 32 of any residual portion of the plural component system located therein.

In certain environments it is desirable to limit the amount of noise polution. When the trigger 24 is in the second position, and the valve head 132 is sealed against the O-ring 144, a small amount of pressurized gas will leak down the drilling 140 into the void area 98. This inevitably produces a certain amount of noise. For both the embodiments illustrated in FIG. 2 and FIG. 5 a noise suppression system can be incorporated. This system is only illustrated in FIG. 2, but is equally applicable to the embodiment shown in FIG. 5.

Communicating with gas passage 112 in valve carrier 108 is a transverse gas port 146 leading into cylindrical chamber 96. At the wall wherein cylindrical chamber 96 is connected with gas duct 94 an annular teflon bushing 148 is inserted. The rear end of the gas passage 112 is threaded to receive a hex head bolt 150. When the valve carrier 108 is in the second position the position of hex head bolt 150 is appropriately adjusted by turning it into or out of the gas passage 112 such that the head of the bolt 150 seats against the annular bushing 148 at the same time that the head 138 of the air valve 132 seats against the O-ring 144. The adjustment is easily done by using a hex key inserted through port 30. This cuts off the supply of pressurized gas to the gas passage 112 since its open rear end is now effectively plugged by the bolt 150. When the trigger 24 is released and the valve carrier 108 moves forward, compressed gas fills the chamber 96 and flows into the gas passage 112 via the gas port 146.

While not forming a part of this invention, an appropriate air timing or logic system can be incorporated to the line connecting to the gas receiving port 30. Such an air logic system senses the increase in pressure within the gas duct 94 when it is sealed off by the interaction of bolt 150 with bushing 148. This control device then shuts off the supply of pressurized air to the gas duct 94 after a predetermined time has expired. Normally gas pressure will be maintained in the line for a limited amount of seconds, such as 10 to 15 seconds. On release of the trigger 24 and movement of the valve carrier 108 forward in response thereto, bolt 150 no longer seals against bushing 148 and the air logic system senses the change in pressure caused by this movement and again supplies pressurized gas to the gun 10.

In the spray gun illustrated in FIG. 5 certain features of the air injection system and mixing chamber are modified to accommodate high pressure gas utilized in spraying systems. The front section 20-a is modified to include screw threads 152 allowing for a spray nozzle to be mounted over the outlet 34-a. Before describing other modifications to the front section 20-a the gas valve 154 will be described. The gas valve 154 has a head 156 which is somewhat smaller than the head of the gas valve 132 shown in the other embodiments. The valve stem 158 is threaded to be received into the valve carrier 108 as before. Extending behind the head 156 down a portion of the length of the stem 158 is a throated or waisted section 160. Section 160 is of a smaller diameter than either the head 156 or the rear portion of the stem 158. A gas passageway 162 extends through the rear portion of the stem 158 and then branches off in a Y and opens up into the frustro-conical shaped shoulder 164 located between the waisted section 160 and the remainder of the stem 158.

Referring to the detail shown in FIG. 6, front section 20 has an annular flange 165 which projects inwardly at the rear of the mixing chamber 32 forming an annular shoulder 166. The annular shoulder 166 has an inside diameter which is slightly larger than the outside diameter of the head 156 such that the head 156 can be drawn into the annular shoulder 166. A curtain or bushing 170 fits into an appropriate drilling 172 in the front section 20-a. It seats against the back of annular shoulder 166 and is retained there by sleeve 171. When the gas valve 154 is pulled to the rear of the gun 10 in response to movement of the valve carrier 108, the head 156 fits into the shoulder 166 and makes a gas impervious seal against the bushing 170, e.g., FIG. 6. When the valve carrier 108 is slid forward the head 156 moves away from the bushing 170, e.g., FIG. 5. The diameter of the centralized opening 174 in the bushing 170 is generally slightly larger than the diameter of the waisted section 160 of the gas valve 154. This allows gas to flow up the gas passage 162 through the drilling 140, through the opening 174 in the bushing 170, and finally through the center of the shoulder 166 into the mixing chamber 32-a to purge or clean the mixing chamber.

The mixing chamber 32-a in the embodiment illustrated in FIGS. 5 and 6 is generally of a smaller diameter than the mixing chamber illustrated in the embodiment in FIG. 2. Further, its diameter is only slightly larger than the diameter of the head 156 of the gas valve 154. For example, the diameter of the chamber 32-a could be 0.140 inches and the diameter of the head 156 could be 0.125 inches. Because of the high pressure which the components of the plural component system are subjected to in a spray system, maintaining the size relationship between the mixing chamber 32-a, the head 156, as well as locating the opening of the dump tubes 36-a and 38-a close to the rear of the mixing chamber 32-a results in minimizing back pressure and increased efficiency of the gun 10. Because the bushing 170 is made of teflon it is easily slid over the head 156 even though the head 156 is of a slightly larger diameter than the diameter of the opening 174 in the bushing.

In operation, the nipples 26 and 28 are connected to appropriate supplies of the components of the plural component system. A pressurized gas system with or without an air logic control is attached to the gas receiving port 30. When the trigger 24 is forward of the handle such that the valve carrier 108 is in a forward or first position, air is ejected into the mixing chamber cleansing it. When the trigger is depressed toward the handle, the air cleansing of the mixing chamber is halted and the valves controlling the components of the plural component system open allowing the individual components to feed into the mixing chamber and be expelled from the outlet. When the trigger is released it returns to its first position halting the flow of the components to the mixing chamber and starting the flow of the air to purge the same.

We claim:

1. A gun for dispensing a plural component system which comprises:

a housing including a first component receiving means, a second component receiving means and a gas receiving means, said first component receiving means connectable to a pressurized source of a first component of said plural component system, said second component receiving means connectable to a pressurized source of a second component of said plural component system and said gas receiving means connectable to a source of pressurized gas;

a first component feed port means connected to said first component receiving means and receiving a pressurized supply of said first component of said plural component system from said first component receiving means;

a second component feed port means connected to said second component receiving means and receiving a pressurized supply of said second component of said plural component system from said second component receiving means;
a first valve means located in said first component feed port means;
a second valve means located in said second component feed port means;
a valve carrier means movably located in said housing;
said first valve means and said second valve means operatively connected to said valve carrier means and movable within said first and said second component feed port means respectively in response to movement of said valve carrier means;
a gas passage means connected to said gas receiving means and receiving a supply of pressurized gas from said gas receiving means, said gas passage means including a gas valve means, said gas valve means operatively connected to said valve carrier means and moving in response to movement of said valve carrier means;
a static mixing chamber means attaching to said housing and including a mixing chamber, a discharge outlet connecting to said mixing chamber, a first component inlet means connecting to said mixing chamber, a second component inlet means connecting to said mixing chamber and a gas inlet means connecting to said mixing chamber, said gas inlet means operatively connected to said gas passage means, said first component inlet means operatively connected to said first component feed port means and said second component inlet means operatively connected to said second component feed port means;
trigger means movably mounted on said housing, said valve carrier means operatively associated with said trigger means, said valve carrier means moving between a first position and a second position;
biasing means associated with said valve carrier means biasing said valve carrier means from said second position to said first position, said trigger means moving said valve carrier means against the bias of said biasing means from said first position to said second position;
said first and said second valve means prohibiting the flow of said first and said second component from said first and said second component feed port means respectively into said first and said second inlet means respectively and said gas valve means allowing flow of said pressurized gas from said gas passage means into said mixing chamber through said gas inlet means when said valve carrier means is in said first position and said first and said second valve means allowing flow of said first and said second components from said first and said second component feed port means into said first and said second component inlet means respectively and into said mixing chamber and controlling the flow of said pressurized gas from said gas passage means into said gas inlet means when said valve carrier means is in said second position;
said first and said second components flowing into said mixing chamber and being discharged out of said discharge outlet when said valve carrier means is in said second position and said pressurized gas flowing into said mixing chamber and discharging the contents of said mixing chamber out of said discharge outlet when said valve carrier means is in said first position.

2. The gun of claim 1 wherein:
said first valve means includes a first valve seat located in said first component feed port means and a first valve slidably located in said first component feed port means and movable between a position wherein said first valve seals against said first valve seat and a position wherein said first valve is not sealed in said first valve seat;
said first component inlet means including a first passageway, said first passageway located between said mixing chamber and said first valve seat,
said second valve means includes a second valve seat located in said second component feed port means and a second valve slidably located in said second component feed port means and movable between a position wherein said second valve seals against said second valve seat and a position wherein said second valve is not seated in said second valve seat;
said second component inlet means including a second passageway, said second passageway located between said mixing chamber and said second valve seat;
said first and said second valves attaching to said valve carrier means and movable in response to movement of said valve carrier means.

3. The gun of claim 2 wherein:
said first component feed port means includes a first closed chamber located within said housing, said first passageway connecting to said first chamber, said first valve seat comprising an annular valve seat located around one end of said first passageway;
said first closed chamber including a valve stem opening, a valve stem sealing means located in said valve stem opening, said first valve including a valve stem slidably passing through said first valve stem sealing means, said first valve stem attaching to said valve carrier means external said first closed chamber;
said second component feed port means including a second closed chamber located within said housing, said second passageway connecting to said second chamber, said second valve seat comprising an annular valve seat located around one end of said second passageway;
said second closed chamber including a second valve stem opening, a second valve stem sealing means located in said second valve opening, said second valve including a second valve stem slidably passing through said second valve stem sealing means, said second valve stem attaching to said second valve carrier means external said second closed chamber.

4. The gun of claim 3 wherein:
said valve carrier means includes a carrier member;
said housing including a carrier member receiving chamber means, at least a portion of said carrier member slidably moving in said carrier member receiving chamber means;
said trigger means comprising a trigger pivotally mounted to said housing, said trigger operatively contacting said carrier member to slide said carrier member in said carrier member receiving chamber means between said first position and said second position.

5. A gun for dispensing a plural component system which comprises:

a housing including a first component receiving means, a second component receiving means and a gas receiving means, said first component receiving means connectable to a pressurized source of a first component of said plural component system, said second component receiving means connectable to a pressurized source of a second component of said plural component system and said gas receiving means connectable to a source of pressurized gas;

a first component feed port means connected to said first component receiving means and receiving a pressurized supply of said first component of said plural component system from said first component receiving means;

a second component feed port means connected to said second component receiving means and receiving a pressurized supply of said second component of said plural component system from said second component receiving means;

a first valve means located in said first component feed port means;

a second valve means located in said second component feed port means;

a valve carrier means movably located in said housing;

said first valve means and said second valve means operatively connected to said valve carrier means and movable within said first and said second component feed port means respectively in response to movement of said valve carrier means;

a gas passage means connected to said gas receiving means and receiving a supply of pressurized gas from said gas receiving means, said gas passage means including a gas valve means, said gas valve means operatively connected to said valve carrier means and moving in response to movement of said valve carrier means;

a static mixing chamber means attaching to said housing and including a mixing chamber, a discharge outlet connecting to said mixing chamber, a first component inlet means connecting to said mixing chamber, a second component inlet means connecting to said mixing chamber and a gas inlet means connecting to said mixing chamber, said gas inlet means operatively connected to said gas passage means, said first component inlet means operatively connected to said first component feed port means and said second component inlet means operatively connected to said second component feed port means;

trigger means movably mounted on said housing, said valve carrier means operatively associated with said trigger means and moving between a first position and a second position in response to movement of said trigger means;

said first and said second valve means prohibiting the flow of said first and said second component from said first and said second component feed port means respectively into said first and said second inlet means respectively and said gas valve means allowing flow of said pressurized gas from said gas passage means into said mixing chamber through said gas inlet means when said valve carrier means is in said first position and said first and said second valve means allowing flow of said first and said second components from said first and said second component feed port means into said first and said second component inlet means respectively and into said mixing chamber and controlling the flow of said pressurized gas from said gas passage means into said gas inlet means when said valve carrier means is in said second position;

said first and said second components flowing into said mixing chamber and being discharged out of said discharge outlet when said valve carrier means is in said second position and said pressurized gas flowing into said mixing chamber and discharging the contents of said mixing chamber out of said discharge outlet when said valve carrier means is in said first position;

said first valve means includes a first valve seat located in said first component feed port means and a first valve slidably located in said first component feed port means and movable between a position wherein said first valve seals against said first valve seat and a position wherein said first valve is not sealed in said first valve seat;

said first component inlet means including a first passageway, said first passageway located between said mixing chamber and said first valve seat;

said second valve means includes a second valve seat located in said second component feed port means and a second valve slidably located in said second component feed port means and movable between a position wherein said second valve seals against said second valve seat and a position wherein said second valve is not seated in said second valve seat;

said second component inlet means including a second passageway, said second passageway located between said mixing chamber and said second valve seat;

said first and said second valves attaching to said valve carrier means and movable in response to movement of said valve carrier means;

said first component feed port means includes a first closed chamber located within said housing, said first passageway connecting to said first chamber, said first valve seat comprising an annular valve seat located around one end of said first passageway;

said first closed chamber including a valve stem opening, a valve stem sealing means located in said valve stem opening, said first valve including a valve stem slidably passing through said first valve stem sealing means, said first valve stem attaching to said valve carrier means external said first closed chamber;

said second component feed port means including a second closed chamber located within said housing, said second passageway connecting to said second chamber, said second valve seat comprising an annular valve seat located around one end of said second passageway;

said second closed chamber including a second valve stem opening, a second valve stem sealing means located in said second valve opening, said second valve including a second valve stem slidably passing through said second valve stem sealing means, said second valve stem attaching to said second valve carrier means external said second closed chamber;

said valve carrier means includes a carrier member;

said housing including a carrier member receiving chamber means, at least a portion of said carrier member slidably moving in said carrier member receiving chamber means;

said trigger means comprising a trigger pivotally mounted to said housing, said trigger operatively contacting said carrier member to slide said carrier member in said carrier member receiving chamber means between said first position and said second position;

said carrier member includes an elongated shaft, an annular flange integrally formed on said elongated shaft, an annular piston integrally formed on said elongated shaft and spaced from said annular flange axially along said elongated shaft;

said first and said second valve stems fixedly attaching to said annular flange;

said carrier member receiving chamber means includes a cylindrical chamber sized to receive said annular piston.

6. The gun of claim 5 wherein:

said gas passage means includes a gas passageway axially oriented along at least a portion of the longitudinal axis of said elongated shaft;

said elongated shaft having a forward end and a rear end, said annular flange located adjacent to said forward end, said annular piston located adjacent to said rear end.

7. The gun of claim 6 wherein:

said gas valve means includes an elongated gas valve including a gas valve stem and a gas valve head, said gas valve stem having an axially oriented gas passageway extending along at least a portion of its longitudinal axis from the rear end of said gas valve toward the forward end of said gas valve, said rear end of said gas valve sealably connecting to said elongated shaft such that said gas passageway in said gas valve stem is continuous with said gas passageway in said elongated shaft;

said gas valve head located on the forward end of said gas valve;

said gas inlet means of said static mixing chamber means including a gas valve head sealing means, said gas valve head capable of forming a gas impervious seal with said gas valve head sealing means.

8. The gun of claim 7 wherein:

said gas valve stem includes a waisted section located intermediate said gas valve head and said rear end of said gas valve, said gas passageway in said gas valve opening into said waisted section, said waisted section having a diameter smaller than the diameter of said gas valve head;

said gas valve head sealing means including an opening sized to receive said gas valve head and a gas valve head seat having an opening smaller than said gas valve head but greater than said waisted section of said gas valve stem such that said valve head can seat against said valve head seat inhibiting flow of gas through said gas valve head seat and said gas valve head can unseat against said valve head seat allowing gas to pass between said waisted section and said gas valve head seat.

9. The gun of claim 7 wherein:

said gas valve includes a transverse oriented gas passageway located intermediate said gas valve head and said rear end of said gas valve and communicating with said axially oriented passageway;

said valve head sealing means includes an opening sized to receive said gas valve stem, said gas valve head larger than said opening;

said opening including a gas valve head seating means capable of forming a gas impervious seal with said gas valve head.

10. The gun of claim 9 wherein:

said gas passage means includes a gas duct connecting said cylindrical chamber and said gas receiving means;

an annular gas duct valve seating means located in said cylindrical chamber wherein said gas duct connects to said cylindrical chamber;

a rear gas valve means located on said rear end of said elongated shaft and movably positionable with respect to said gas duct valve seating means in response to movement of said elongated shaft.

11. The gun of claim 10 wherein:

said rear gas valve means includes a rear gas valve member including a rear valve head adjustably positionable on said elongated shaft;

said gas duct valve seating means includes a rear valve seat located in said cylindrical chamber such that said rear valve head of said rear valve member is adjustable to seat against said rear valve seat when said carrier member is in said second position and said valve head of said rear valve member moves away from said valve seat when said carrier member is in said first position allowing passage of gas from said gas duct to said cylindrical chamber;

a gas passage opening located in said elongated shaft adjacent to said rear gas valve member and communicating with said gas passageway in said elongated shaft to allow gas passed through said rear valve seat into said cylindrical chamber to flow into said gas passageway in said elongated shaft.

* * * * *